United States Patent
Lin et al.

(10) Patent No.: US 10,549,773 B2
(45) Date of Patent: Feb. 4, 2020

(54) ANTI-LOSS-OF-ASSISTANCE FOR ELECTRIC MOTOR

(71) Applicant: GM Global Technology Operations LLC, Detroit, MI (US)

(72) Inventors: Wen-Chiao Lin, Rochester Hills, MI (US); Xinyu Du, Oakland Township, MI (US); Yat-chung Tang, Rochester, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 84 days.

(21) Appl. No.: 15/840,270

(22) Filed: Dec. 13, 2017

(65) Prior Publication Data

US 2019/0176873 A1 Jun. 13, 2019

(51) Int. Cl.
   *B62D 5/04* (2006.01)
   *B62D 6/10* (2006.01)
(52) U.S. Cl.
   CPC .......... *B62D 5/0463* (2013.01); *B62D 5/0481* (2013.01); *B62D 6/10* (2013.01)
(58) Field of Classification Search
   CPC .. B62D 5/0463; B62D 5/0481; B62D 5/0484; B62D 5/0487; B62D 6/10
   See application file for complete search history.

(56) References Cited

U.S. PATENT DOCUMENTS

| | | | |
|---|---|---|---|
| 7,973,504 B2 | 7/2011 | Namuduri et al. | |
| 8,634,986 B2 | 1/2014 | Ghoneim | |
| 9,751,556 B1 | 9/2017 | Lin et al. | |
| 2010/0045217 A1* | 2/2010 | Ueda | B62D 5/046 318/400.02 |
| 2013/0342148 A1* | 12/2013 | Yanai | B62D 5/0487 318/472 |
| 2015/0105972 A1* | 4/2015 | Madison | G07C 5/085 701/33.2 |
| 2017/0113714 A1* | 4/2017 | Guerra | B62D 5/0463 |

OTHER PUBLICATIONS

U.S. Appl. No. 15/333,216.

* cited by examiner

*Primary Examiner* — Aaron L Troost

(57) ABSTRACT

A method of operating an electric power steering system installed on a vehicle. The electric power steering system includes a controller that receives a desired assist torque value and supplies a pulse-width modulation duty cycle to an electric motor. The method includes the step of controlling the electric motor to achieve a nominal value of power steering assist torque when the electrical power available to the motor is sufficient to achieve the nominal value of power steering assist torque. The method further includes the step of controlling the electric motor to achieve a reduced value of power steering assist torque less than the nominal value when the electrical power available to the motor is not sufficient to achieve the nominal value of power steering assist torque.

20 Claims, 4 Drawing Sheets

ANTI-LOSS-OF-ASSISTANCE FOR ELECTRIC MOTOR

INTRODUCTION

The present disclosure relates generally to a method for improving the operation of an electric power steering (EPS) control system. More particularly, the disclosure relates to a method for recognizing a condition in which normal power steering assist is not available, and modifying the operation of the power steering system to allow operation at a reduced level of steering assist, thereby avoiding total and unexpected loss of power steering assist.

Modern electric power steering systems for vehicles employ an electric motor coupled to the steering gear to generate a steering assist torque. A steering-wheel torque sensor is used to sense driver torque demand, which is used to determine a desired level of assist torque. Power is supplied to the electric motor to provide the desired level of assist torque.

In the event of reduced battery voltage or of increased resistance in the EPS power circuit, e.g. increased power connector resistance, the electrical system of the vehicle may be incapable of providing enough power to the motor to provide the desired level of assist torque. As a result a sudden loss of torque assist may occur, with the vehicle driver suddenly required to provide through the steering wheel all of the torque required to steer the vehicle.

Thus, while current electric power steering systems achieve their intended purpose, there is a need for a new and improved system and method for avoiding sudden and total loss of steering assist torque.

SUMMARY

According to several aspects, a method of operating an electric power steering system installed on a vehicle is disclosed. The electric power steering system includes an electric motor and a controller that receives a desired assist torque value and supplies a pulse-width modulation duty cycle to the electric motor. The method further includes controlling the electric motor to achieve a nominal value of power steering assist torque when the electrical power available to the motor is sufficient to achieve the nominal value of power steering assist torque, and controlling the electric motor to achieve a reduced value of power steering assist torque less than the nominal value when the electrical power available to the motor is not sufficient to achieve the nominal value of power steering assist torque.

In an additional aspect of the present disclosure, the reduced value of power steering assist torque is achieved by limiting a maximum value of desired assist torque to a value that is calculated based on the determined electrical resistance.

In another aspect of the present disclosure, the reduced value of power steering assist torque is achieved by limiting a maximum pulse-width modulation duty cycle to a value that is calculated based on the determined electrical resistance.

In another aspect of the disclosure, notification is provided to an operator of the vehicle when the power steering system has been controlled to operate with the reduced value of power steering assist torque.

In yet another aspect of the present disclosure, diagnostic information is provided when the power steering system has been controlled to operate with the reduced value of power steering assist torque.

In an aspect, providing the diagnostic information includes storing the diagnostic information in non-volatile memory and communicating the diagnostic information to a reading device connected to a diagnostic port on the vehicle.

In another aspect, providing diagnostic information includes wirelessly communicating the diagnostic information to a receiver that is not physically connected to the vehicle.

According to several aspects, a controller for controlling the operation of an electric power steering system that includes an electric motor is disclosed. The controller is programmed to receive a desired assist torque value and to supply a pulse-width modulation duty cycle to the electric motor. The controller is further programmed to control the electric motor to achieve a nominal value of power steering assist torque when the electrical power available to the motor is sufficient to achieve the nominal value of power steering assist torque, and to control the electric motor to achieve a reduced value of power steering assist torque less than the nominal value when the electrical power available to the motor is not sufficient to achieve the nominal value of power steering assist torque the nominal value of power steering assist torque.

In an additional aspect of the present disclosure, the reduced value of power steering assist torque is achieved by limiting a maximum value of desired assist torque to a value that is calculated based on the determined electrical resistance.

In another aspect of the present disclosure, the reduced value of power steering assist torque is achieved by limiting a maximum pulse-width modulation duty cycle to a value that is calculated based on the determined electrical resistance.

In another aspect of the disclosure, notification is provided to a vehicle operator when the power steering system has been controlled to operate with the reduced value of power steering assist torque.

In yet another aspect of the present disclosure, diagnostic information is provided when the power steering system has been controlled to operate with the reduced value of power steering assist torque.

In an aspect, providing the diagnostic information includes storing the diagnostic information in non-volatile memory and communicating the diagnostic information to a reading device connected to a diagnostic port communicatively coupled to the controller.

According to several aspects, a method of operating a system that includes an electric motor and a controller that receives a desired assist torque value and supplies a pulse-width modulation duty cycle to the electric motor is disclosed. The method includes controlling the electric motor to achieve a nominal value of assist torque when the electrical power available to the motor is sufficient to achieve the nominal value of power steering assist torque, and controlling the electric motor to achieve a reduced value of assist torque less than the nominal value when the electrical power available to the motor is not sufficient to achieve the nominal value of power steering assist torque.

In an additional aspect of the present disclosure, the reduced value of assist torque is achieved by limiting a maximum value of desired assist torque to a value that is calculated based on the determined electrical resistance.

In another aspect of the present disclosure, the reduced value of assist torque is achieved by limiting a maximum pulse-width modulation duty cycle to a value that is calculated based on the determined electrical resistance.

In another aspect of the disclosure, notification is provided to an operator of the system when the system has been controlled to operate with the reduced value of assist torque.

In yet another aspect of the present disclosure, diagnostic information is provided when the system has been controlled to operate with the reduced value of assist torque.

In an aspect, providing the diagnostic information includes storing the diagnostic information in non-volatile memory and communicating the diagnostic information to a reading device connected to a diagnostic port included in the system.

In another aspect, providing diagnostic information includes wirelessly communicating the diagnostic information to a receiver that is not physically connected to the system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
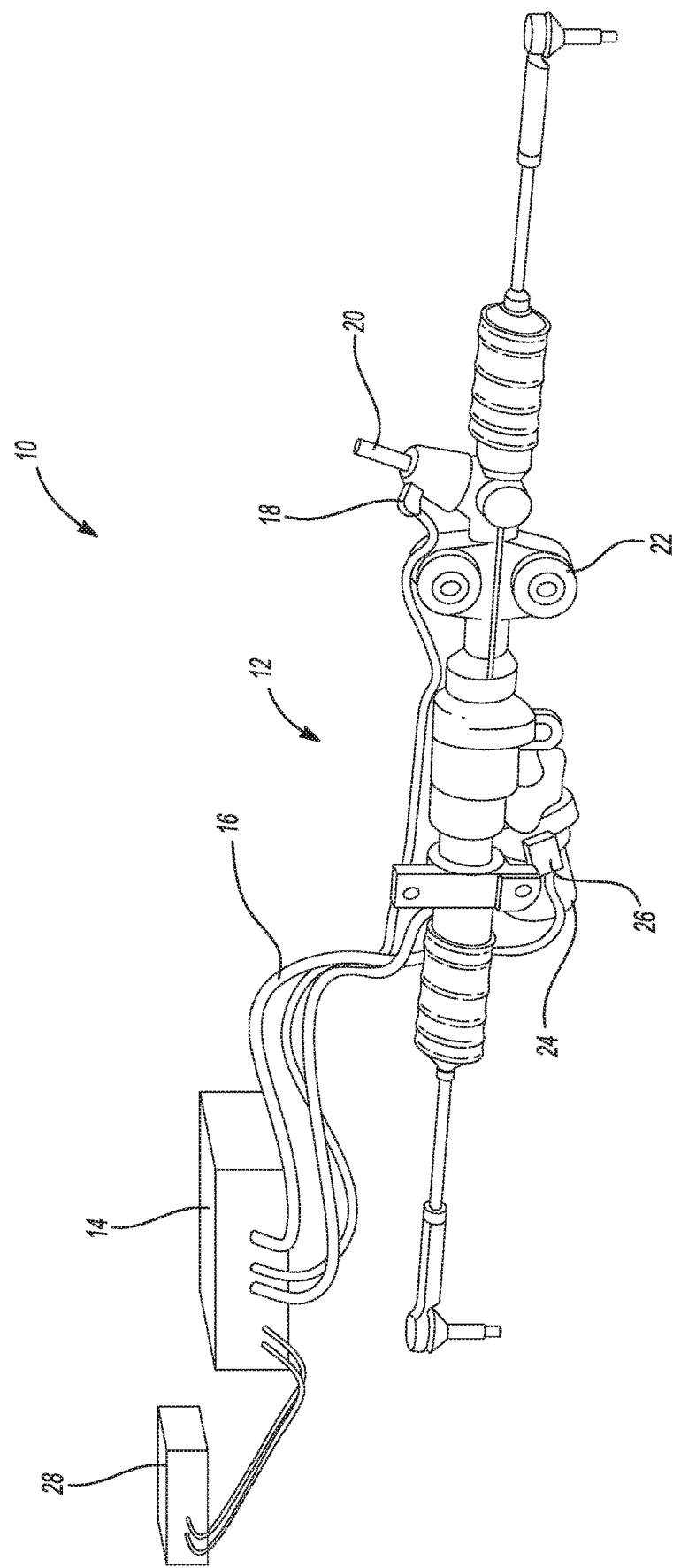
FIG. 1 is a depiction of an electric power steering system according to an exemplary embodiment.

Referring to FIG. 1, a depiction of an EPS system 10 for a vehicle is presented. The EPS system 10 includes a vehicle steering assembly 12 electrically coupled to a controller 14 by a wire harness 16. FIG. 1 also depicts a power connector 28 configured to convey electrical power from a vehicle battery (not shown) to the controller 14. The assembly 12 includes a torque sensor 18 that detects rotation and driver input torque of a shaft 20 that is rotated by a vehicle steering wheel (not shown). The assembly 12 also includes a rack and pinion steering gear assembly 22 that transfers rotation of the steering wheel to the wheels of the vehicle in a manner that is well understood to those skilled in the art. The assembly 12 also includes a motor 24 and a position sensor 26. The motor 24 provides a torque assist to the vehicle steering wheel and the steering gear assembly 22 to reduce the turning effort of the steering wheel by the driver, as is well understood in the art. The position sensor 26 provides signals of the position of the motor 24 so that the controller 14 can accurately provide the torque assist in the proper direction. The harness 16 can include a motor cable for the motor 24, a motor position sensor cable for the position sensor 26 and a torque sensor cable for the torque sensor 18.

The motor 24 is typically an AC machine that includes three coils on the stator and permanent magnets on the rotor. Current signals applied to the stator coils that are in-phase with the voltage generated by the motor 24 cause the motor 24 to provide positive torque, and current signals applied to the stator coils that are 180° out-of-phase with the voltage generated by the motor 24 cause the motor 24 to provide negative torque.

The controller 14, although schematically depicted as a single controller, may be implemented as one controller, or as system of controllers in cooperation to collectively manage the EPS system. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 14 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 14 may also store a number of algorithms or computer executable instructions needed to issue commands to perform actions such as prognosis according to the present disclosure.

The terms control module, module, controller, electronic control unit (ECU), processor, and similar terms used herein mean any suitable device or various combinations of devices, including Application Specific Integrated Circuit(s) (ASIC), electronic circuit(s), central processing unit(s) (preferably including microprocessors), and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 14 includes a set of control algorithms, including resident software program instructions and calibrations stored in memory and executed to provide desired functions. The algorithms may be executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals during ongoing vehicle operation. Alternatively, algorithms may be executed in response to occurrence of one more event observed by the controller.

Figure 2:
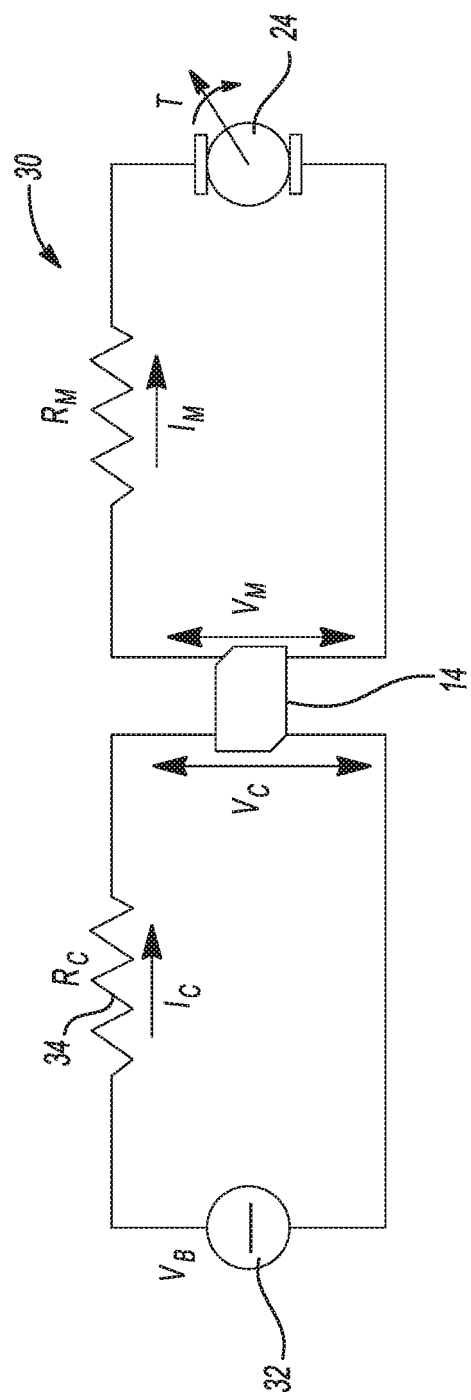
FIG. 2 is an electrical schematic diagram of an EPS motor control circuit according to an exemplary embodiment.

Referring to FIG. 2, an electrical schematic of a motor drive circuit 30 is presented. For purposes of explaining the principles of the disclosure, in FIG. 2 the motor 24 is depicted as a DC motor controlled by a PWM (pulse-width modulated) DC voltage rather than as the 3-phase motor described relative to FIG. 1. One skilled in the art will appreciate that the general principles described herein relative to the DC motor 24 of FIG. 2 can be applied to the 3-phase motor described relative to FIG. 1. FIG. 2 includes a voltage source 32, such as a vehicle battery, which provides a voltage $V_B$ to the controller 14 through a wiring harness and associated connectors (e.g. connector 28 in FIG. 1). The ohmic resistance of the wiring and connectors between the voltage source 32 and the controller 14 is represented in FIG. 2 by a resistor 34 having a resistance value $R_C$. A system and method for determining a value of the connector resistance $R_C$ is disclosed in commonly owned U.S. patent application Ser. No. 15/333,216, the entire disclosure of which is hereby incorporated by reference. A supply current $I_C$ flows from the voltage source 32 through the resistor 34 to the controller 14, such that the $V_C$, the voltage at the input of the controller 14, can be expressed as:

$$V_C = V_B - I_C R_C \quad (1)$$

With continued reference to FIG. 2, the controller 14 provides a motor drive voltage $V_M$ which is related to the controller input voltage $V_C$ by the relationship:

$$V_M = V_C \alpha \quad (2)$$

where α represents a PWM duty cycle applied to the motor drive voltage by the controller 14. In an alternate embodiment, α may represent an analog scaling factor applied by the controller 14 and relating $V_M$ and $V_C$ according to equation (2). In yet another alternate embodiment, α may represent a combination of a PWM duty cycle and an analog scaling factor, i.e. the voltage $V_M$ may be a pulse-width modulated voltage having a different zero-to-peak value than the controller input voltage $V_C$.

The electrical power delivered to the controller 14 by the voltage source 32, which is the product of the voltage $V_C$ and the current $I_C$, is equal to the sum of the electrical power delivered to the motor 24 and the electrical power dissipated in the portion of the controller 14 depicted in FIG. 2.

$$\text{Power} = V_C I_C = V_M I_M + \text{ECU usage} \quad (3)$$

Considering the power dissipated in the controller 14 to be negligible relative to the power delivered to the motor 24, equation (3) can be simplified to:

$$\text{Power} = V_C I_C = V_M I_M \quad (4)$$

Combining equation (2) with equation (4) results in:

$$V_C I_C = V_C \alpha I_M \quad (5)$$

or $$I_C = I_M \alpha \quad (6)$$

Combining equation (1) with equation (6) yields:

$$V_C = V_B - I_M \alpha R_C \quad (7)$$

If the connection resistance $R_C$ is too large or if $V_B$ is too low, the input voltage $V_C$ at the ECU may fall to a value below a minimum value at which the EPS system can provide steering assist. This minimum value, which may be predetermined by a supplier of an EPS ECU, will be referred to as $V_{Cmin}$. A goal of preventing loss of steering assist is to keep the input voltage $V_C$ above $V_{Cmin}$. This goal can be expressed mathematically as:

$$V_B - I_M \alpha R_C \geq V_{Cmin} \quad (8)$$

or $$I_M \leq \frac{V_B - V_{Cmin}}{\alpha R_C} \quad (9)$$

A first nonlimiting embodiment disclosed herein prevents sudden loss of steering assist by limiting the motor torque $T_M$. The motor torque $T_M$ is proportional to the motor current $I_M$, and may be expressed in terms of a motor torque constant $K_t$ as:

$$T_M = K_t I_M \quad (10)$$

Combining equations (9) and (10) yields:

$$T_M \leq K_t \frac{V_B - V_{Cmin}}{\alpha R_C} \quad (11)$$

Since the duty cycle α can range from 0 to 1, setting α=1 in the inequality (11) allows calculation of a limit value of motor torque as:

$$T_{limit} \leq K_t \frac{V_B - V_{Cmin}}{R_C} \quad (12)$$

By limiting the desired motor torque $T_M$ to not exceed $T_{limit}$ as calculated by equation (12), abrupt loss of steering assistance can be prevented.

A second nonlimiting embodiment disclosed herein prevents sudden loss of steering assist by limiting the PWM duty cycle α. The back emf across the motor 24 can be calculated as the product of the motor torque constant $K_t$ and the motor speed ω, and the sum of the voltage drop across the resistor $R_M$ and the back emf the motor is the voltage $V_M$:

$$V_M = R_M I_M + K_t \omega \quad (13)$$

Combining equations (2), (7), and (13) yields:

$$R_M I_M + K_t \omega = \alpha (V_B - I_M \alpha R_C) \quad (14)$$

Solving equation (14) for $I_M$:

$$I_M = \frac{V_B - K_t \omega}{R_M + \alpha^2 R_C} \quad (15)$$

Substituting equation (15) into (8) results in:

$$V_B - \frac{V_B - K_t \omega}{R_M + \alpha^2 R_C} \alpha R_C \geq V_{Cmin} \quad (16)$$

Solving (16) for α yields:

$$\alpha \leq \frac{K_t \omega}{2 V_{Cmin}} + \sqrt{\left(\frac{K_t \omega}{2 V_{Cmin}}\right)^2 - \frac{V_{Cmin} R_M - V_B R_M}{R_C V_{Cmin}}} \quad (17)$$

By limiting the PWM duty cycle α to a value that does not exceed the α value as calculated by equation (17), abrupt loss of steering assistance can be prevented.

Considering the terms in equation (17), the value of α should be considered a desired value of α(k+1), that is, a value that is calculated during the $k^{th}$ time interval to be used as a control target for the $(k+1)^{th}$ time interval. Of the other variables in equation (17), the motor speed ω may be considered to be changing rapidly enough that an estimate at time (k+1) should be used. The other terms in equation (17) may be considered to be varying slowly enough that the present value of each at time (k) may be used in the calculation. With these considerations in mind, the maximum allowable pulse width duty cycle value $\alpha_{limit}$ can be determined from equation (17) as:

$$\alpha_{limit} = \alpha(k+1) = \frac{K_t \omega(k+1)}{2V_{Cmin}} + \sqrt{\left(\frac{K_t \omega(k+1)}{2V_{Cmin}}\right)^2 - \frac{V_{Cmin} R_M - V_B R_M}{R_C V_{Cmin}}} \quad (18)$$

Several approaches may be used to estimate the motor speed ω at time (k+1). If the self-aligning torque (SAT) is available or computable at time k, the motor speed ω at time (k+1) can be estimated using:

$$J\left(\frac{\omega(k+1) - \omega(k)}{\Delta T}\right) = \quad (19)$$
$$K_t I_M(k) + T_{ts}(k) - T_L(k) - B\omega(k) - C_{fr}\text{sgn}(\omega(k))$$

where J represents a moment of inertia, $T_{ts}$ is the torque provided by the vehicle driver as measured by the torque sensor 18, $T_L(k)$ is the SAT at time (k), B is a damping coefficient, and $C_{fr}$ is a friction coefficient.

If the SAT is not available or computable at time k, other estimates of ω(k+1) may be used. By way of non-limiting example, assuming the angular velocity ω varies slowly ω(k+1) can be set to ω(k), the current angular velocity. Alternatively, assuming the angular acceleration varies slowly ω(k+1) can be calculated as 2ω(k)−ω(k−1), where ω(k−1) represents angular velocity calculated at a previous time k−1.

Figure 3:
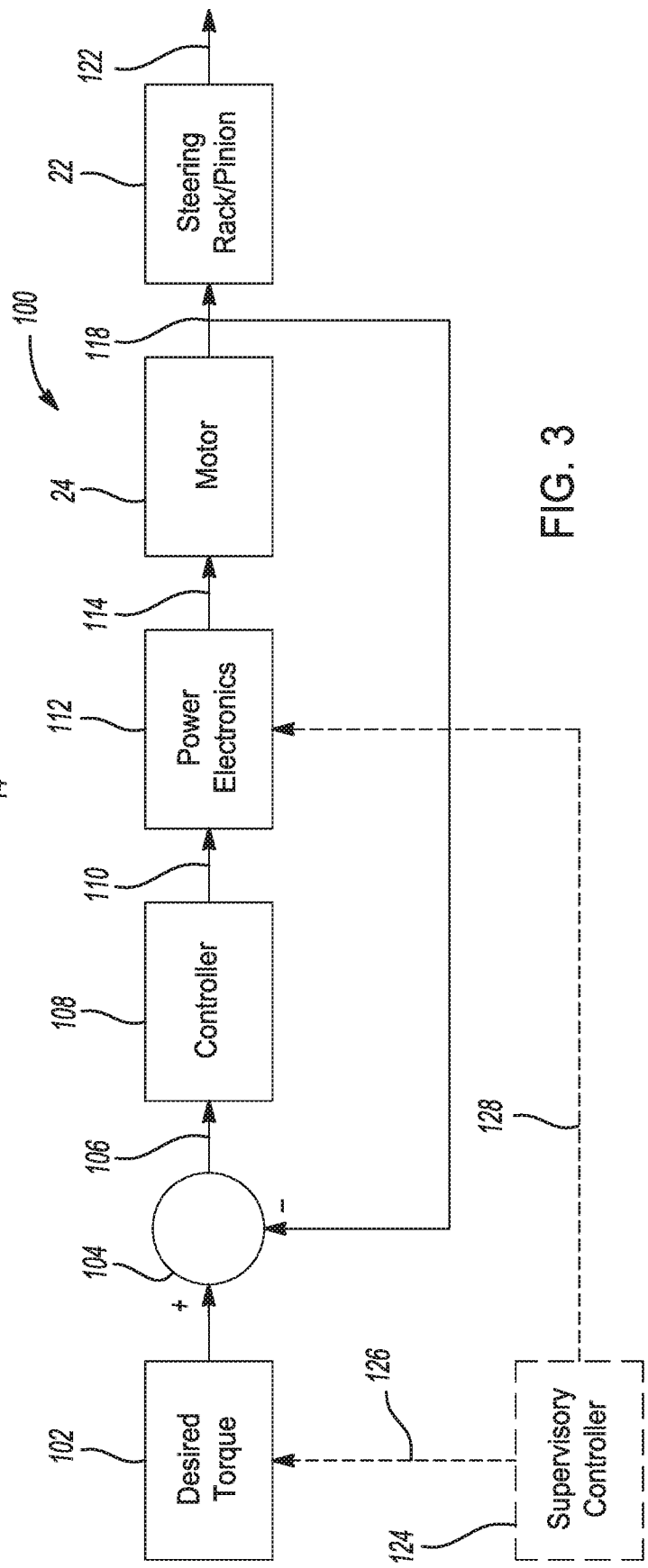
FIG. 3 is a block diagram for an EPS control system according to an exemplary embodiment.

FIG. 3 is a block diagram of an EPS control system 100 according to an embodiment of the disclosure. In FIG. 3 a desired assist torque 102, which is derived from a signal from the torque sensor 18 as well as other factors (e.g. vehicle speed), is an input to a summing junction 104. The term "nominal value of power steering assist torque" is used herein to describe a value of desired assist torque 102 that is not reduced due to considerations of vehicle electrical conditions as described in the present disclosure. A measured motor torque signal 118 indicative of a motor torque $T_M$ is subtracted from the desired torque 102 to produce a torque error signal 106. The torque error signal 106 is an input to a controller 108, which sends a control signal 110, which is based on the torque error signal 106, to a power electronics circuit 112. The controller 108 and the power electronics circuit 112 in FIG. 3 can be portions of the controller 14 described relative to FIG. 2.

With continued reference to FIG. 3, the power electronics circuit 112 applies a duty cycle α to a controller voltage $V_C$ to deliver a motor voltage $V_M = V_C \alpha$ at an input 114 to the motor 24. The motor 24 produces a torque $T_M$ which is applied to the steering rack/pinion 22 to move the tie rods 122 to steer the vehicle wheels. As disclosed earlier, a signal 118 related to the motor torque $T_M$ is fed back to the summing junction 104 to be compared to the desired torque signal 102 to produce the torque error signal 106.

The exemplary control system depicted in FIG. 3 additionally includes a supervisory controller 124. In a first embodiment of the disclosure, the supervisory controller 124 is configured to provide a signal 126 to modify the desired torque 102 to prevent abrupt loss of steering assist, as described earlier. By way of non-limiting example, a limit value of motor torque $T_{limit}$ may be calculated according to equation (12) above.

Figure 4:
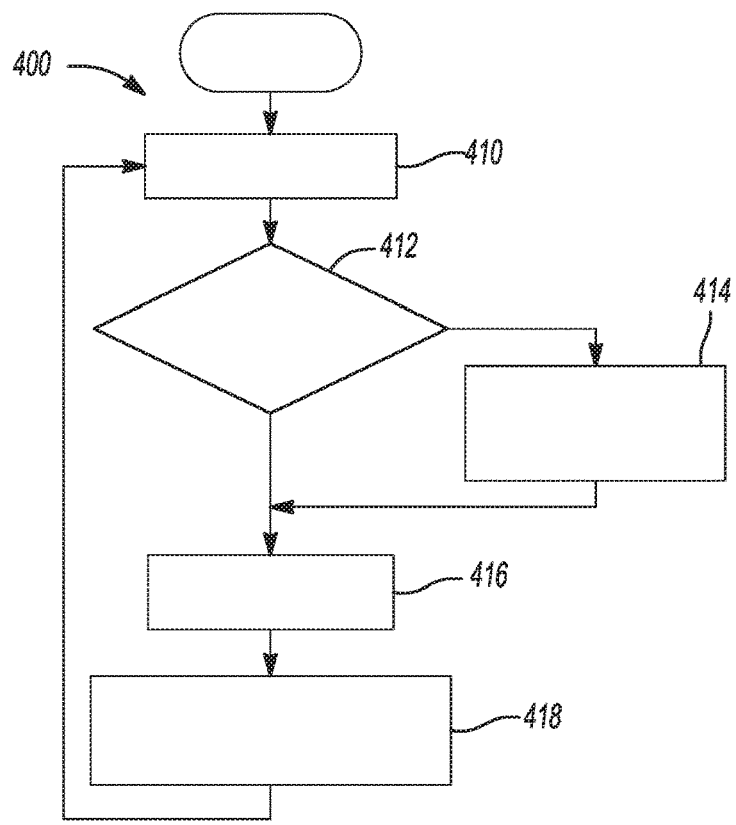
FIG. 4 is a flow chart of a method for limiting desired EPS assist torque according to an exemplary embodiment.

Referring to FIG. 4, a flow chart of an exemplary method 400 to determine a desired torque value is depicted. The method 400 includes a loop that is executed repeatedly through time, with each execution identified by an index "k", such that a loop execution immediately preceding the "$k^{th}$" execution has an index (k−1), a loop execution immediately following the "$k^{th}$" execution has an index (k+1), and so forth, as indicated by step 410.

In step 412, a present value of $R_C$, the resistance of the wiring and connectors in the motor circuit represented by element 34 in FIG. 2, is compared to a predetermined threshold value that represents a nominal resistance value of non-degraded wiring and connectors. If $R_C$ is not greater than the predetermined threshold value, the method continues to step 414. In step 414, the value of $R_C$ to be used in calculating a limit torque in step 416 is set to the threshold value, and the process flow continues to step 416. This ensures that a non-zero value is used for $R_C$ in subsequent calculations. If the determination in step 412 is that $R_C$ is greater than the threshold value, the process flow continues directly from step 412 to step 416.

In step 416 a value of limit torque $T_{limit}$ is calculated, for example using $$T_{limit} = K_t \frac{V_B - V_{Cmin}}{R_C}$$

as presented in equation (12) above.

The value of $R_C$ used in the calculation in step 416 is either the predetermined threshold value (if $R_C$ was determined to be not greater than the predetermined threshold value) or the actual value of $R_C$ (if $R_C$ was determined to be greater than the predetermined threshold value).

With continued reference to FIG. 4, in process step 418 a new value of desired torque $T_{new}$ to be used in the (k+1)st occurrence of the control loop is determined. In step 418 the desired torque is set to the lesser of the originally determined desired torque (based on vehicle driver input to the steering wheel) and the calculated value of $T_{limit}$. Referring again to FIG. 3, the new value $T_{new}$ of desired torque is communicated by the supervisory controller 124 by way of signal path 126. The method thereby limits the maximum desired torque to a value that is based on the electrical resistance $R_C$ and the vehicle battery voltage $V_B$.

Referring again to FIG. 3, in a second embodiment of the disclosure, the supervisory controller 124 is configured to provide a signal 128 to the power electronics circuit 112 to modify the duty cycle α used to determine the motor voltage $V_M$, so as to prevent abrupt loss of steering assist as described earlier. By way of non-limiting example, a limit value of motor torque duty cycle α may be calculated according to equation (18) above.

Figure 5:
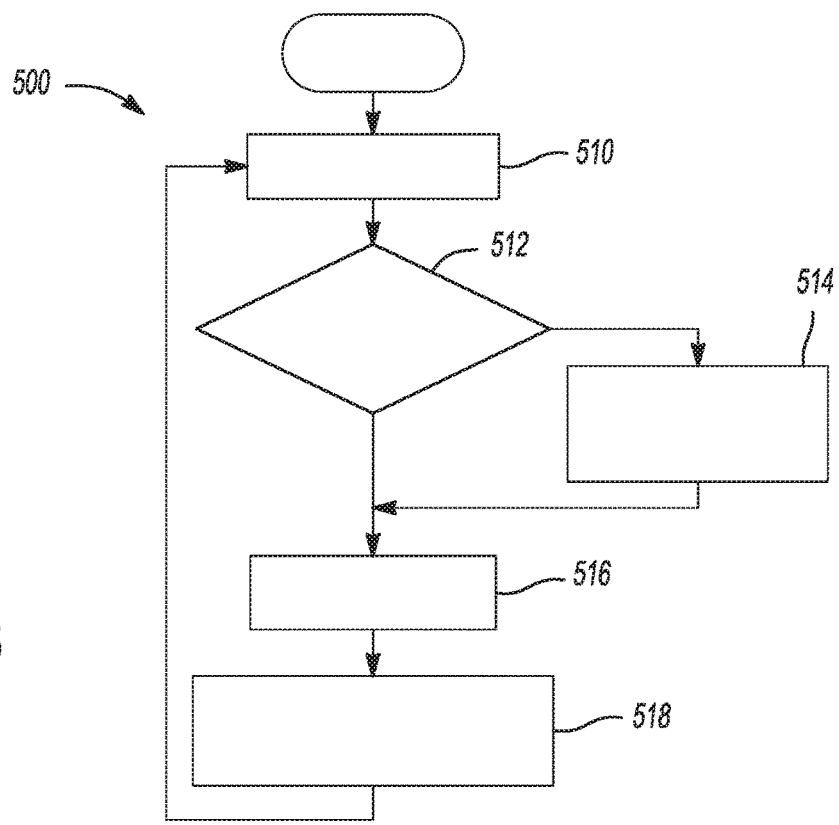
FIG. 5 is a flow chart of a method for limiting a duty cycle of a PWM motor drive signal according to an exemplary embodiment.

Referring to FIG. 5, a flow chart of an exemplary method 500 to determine a desired torque value is depicted. The method 500 includes a loop that is executed repeatedly through time, with each execution identified by an index "k", such that a loop execution immediately preceding the "k"th execution has an index (k−1), a loop execution immediately following the "k"th execution has an index (k+1), and so forth, as indicated by step 510.

In step 512, a present value of $R_C$, the resistance of the wiring and connectors in the motor circuit represented by element 34 in FIG. 2, is compared to a predetermined threshold value that represents a nominal resistance value of non-degraded wiring and connectors. If $R_C$ is not greater than the predetermined threshold value, the method continues to step 514. In step 514, the value of $R_C$ to be used in calculating a limit torque in step 516 is set to the threshold value, and the process flow continues to step 516. This ensures that a non-zero value is used for $R_C$ in subsequent calculations. If the determination in step 512 is that $R_C$ is greater than the threshold value, the process flow continues directly from step 512 to step 516.

In step 516 a value of limit torque $\alpha_{limit}$ is calculated, for example using $$\alpha_{limit} = \frac{K_t \omega(k+1)}{2V_{Cmin}} + \sqrt{\left(\frac{K_t \omega(k+1)}{2V_{Cmin}}\right)^2 - \frac{V_{Cmin} R_M - V_B R_M}{R_C V_{Cmin}}}$$

as presented in equation (18) above. The value of $R_C$ used in the calculation in step 516 is either the predetermined threshold value (if $R_C$ was determined to be not greater than the predetermined threshold value) or the actual value of $R_C$ (if $R_C$ was determined to be greater than the predetermined threshold value).

With continued reference to FIG. 5, in process step 518 a new value of desired PWM duty cycle $\alpha_{new}$ to be used in the (k+1)st occurrence of the control loop is determined. In step 518 the desired PWM duty cycle $\alpha_{new}$ is set to the lesser of the originally determined PWM duty cycle (based on vehicle driver input to the steering wheel) and the calculated value of $\alpha_{limit}$. Referring again to FIG. 3, the new value $\alpha_{new}$ of desired torque is communicated by the supervisory controller 124 to the power electronics circuit 112 by way of signal path 128. The method thereby limits the maximum PWM duty cycle to a value that is based on the electrical resistance $R_C$ and the vehicle battery voltage $V_B$.

Figure 6:
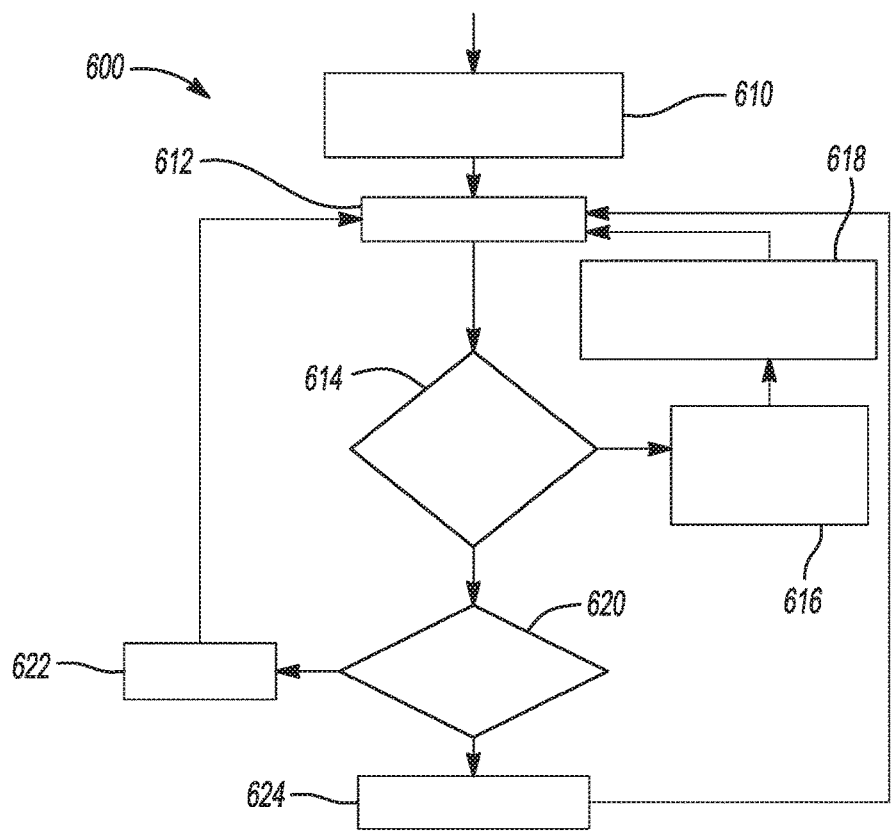
FIG. 6 is a flow chart of a method for providing real-time notification of reduced EPS assist according to an exemplary embodiment.

FIG. 6 depicts a flow chart of a method 600 for providing real-time notification of reduced EPS assist according to an exemplary embodiment. The method 600 is entered on each vehicle ignition cycle, i.e. every time the vehicle is initially powered up. In step 610 counters $C_O$ and $C_P$ are initialized to 0. The method then proceeds through the loop that starts at step 612. From step 612 the method proceeds to step 614, where a decision is made whether or not reduced assist is called for. Referring back to FIG. 4 and FIG. 5, it will be appreciated that the decision in step 614 corresponds to the determination in step 418 of FIG. 4 or in step 518 of FIG. 5. If $T_{new}$ was set to $T_{limit}$ in step 418, or if $\alpha_{new}$ was set to $\alpha_{limit}$ in step 518, the method 600 proceeds from decision step 614 to step 616. In step 616 the counter $C_P$ is incremented, and values of $R_C$ and battery voltage are saved. The saved values of $R_C$ and battery voltage may include the maximum $R_C$ and the minimum battery voltage, the most recent value of each, and/or the average value of each. Following step 616, the method proceeds to step 618, where a notification is provided that the EPS is operating with reduced assist. This notification may include a visual indicator such as a light on the instrument panel of the vehicle and/or an audible indicator. Following step 618, the method returns to step 612 to await the next loop execution.

With continued reference to FIG. 6, if the determination in decision step 614 is that there is not a need in the present loop to reduce assist torque, the method 600 proceeds to step 620. In step 620, the value of counter $C_P$ is checked. If $C_P$ is zero, indicating that there have been no instances of reduced assist during the current ignition cycle, the counter $C_O$ is reset to zero in step 622, and the method returns to step 612 to await the next loop execution. If the result of the test in step 620 is that $C_P$ is not equal to zero, the method proceeds to step 624. This would be the case if reduced assist is not currently being indicated but was previously indicated during the current ignition cycle. In step 624 the counter $C_O$ is incremented. Following step 624, the method returns to step 612 to await the next loop execution. Execution of method 600 preferably occurs until recognition of the vehicle ignition cycle ending, such as when the vehicle key is turned off.

Figure 7:
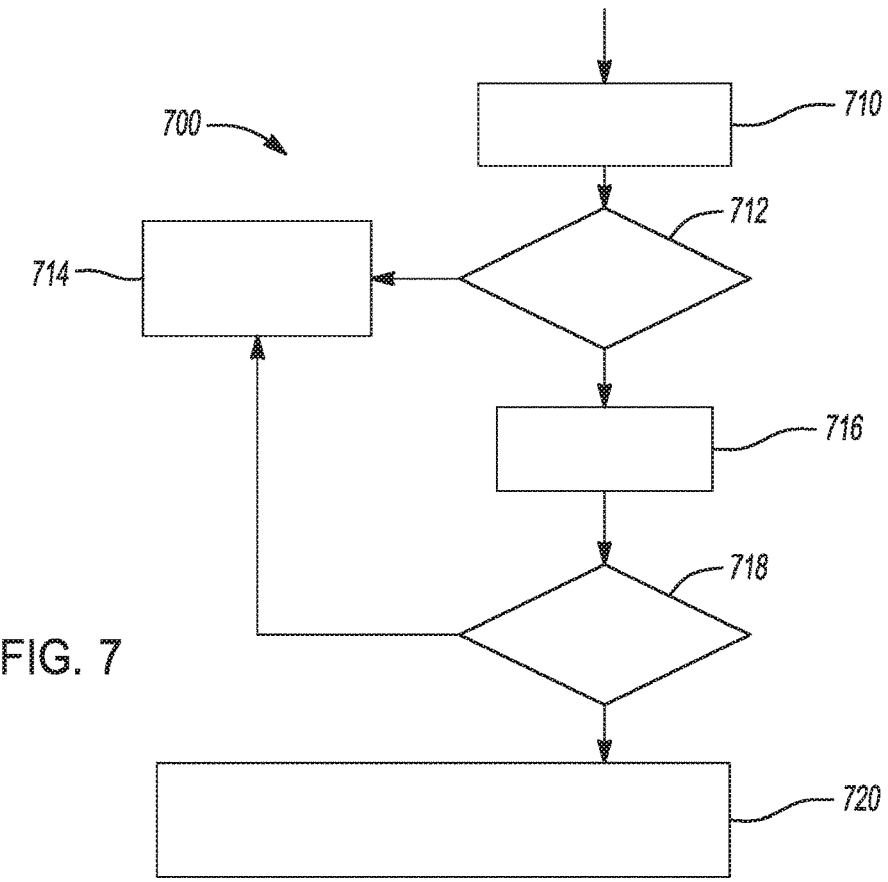
FIG. 7 is a flow chart of a method for preserving diagnostic information relating to reduced EPS assist.

FIG. 7 is a flow chart of a method 700 for preserving diagnostic information relating to reduced EPS assist. Execution of method 700 preferably occurs upon recognition of the vehicle ignition cycle ending, such as when the vehicle key is turned off. Upon entry of the method 700, step 710 is executed, wherein the counter values $C_O$ and $C_P$ are saved. Execution then proceeds to decision step 712, which checks if the value of $C_P$ is zero. If the result of the test in step 712 is that the value of $C_P$ is zero, this indicates that there were no instances of reduced assist during the just-ended ignition cycle. In this case, the method 700 proceeds to step 714. In step 714 the method may set a flag indicating that the connector resistance and the battery voltage did not exhibit any problems.

Continuing to refer to FIG. 7, if the result of the test in step 712 is that the value of $C_P$ is not zero, this indicates that there was at least one instance of reduced assist during the just-ended ignition cycle. In this case, the method proceeds to step 716. In step 716 the quantity $C_P/(C_P+C_O)$ is calculated. It will be appreciated that this quantity represents a fraction of time during the just-ended ignition cycle during which the EPS system was operating with reduced assist. The method then continues to step 718, where the quantity calculated in step 716 is compared to a predetermined threshold $T_3$. Advantageously $T_3$ may be a calibratable threshold. If the fraction of time during which the EPS system was operating with reduced assist exceeds the threshold $T_3$, the method proceeds to step 720, where diagnostic notifications are stored. The diagnostic information that is stored may include indications of increased connector resistance $R_C$ or low battery voltage $V_B$. If the fraction of time during which the EPS system was operating with reduced assist does not exceed the threshold $T_3$, the method proceeds to step 714. As a result, spurious voltage or resistance readings do not result in false positive indications of a problem.

Execution of step 712 and the steps that follow step 712 in FIG. 7 may take place in the limited time between vehicle key-off and controller shut-down. Alternatively, execution of these steps may be executed at the beginning of the next ignition cycle, i.e. after the next vehicle key-on event. As another alternative, values of $C_O$ and $C_P$ may be transmitted to a receiver that is not connected to the vehicle, to be used in subsequent processing.

A method of operating an electric power steering system of the present disclosure offers several advantages. A method as disclosed can prevent sudden unexpected total loss of EPS assist by determining an available level of EPS assist based on current vehicle parameters (i.e. battery voltage and wiring/connector ohmic resistance) and operating to provide EPS assist at that available level. A method as disclosed can provide notification to the vehicle driver of potential future reduction in EPS assist before such reduction actually occurs, for example by providing notification of excessive $R_C$ or low $V_B$, allowing for repair to be performed proactively. As a non-limiting example, such notification can be in the form of illuminating an indicator lamp on a vehicle instrumentation display. As another non-limiting example, diagnostic information can be stored in non-volatile memory and communicated to a diagnostic device plugged into a diagnostic connector on a vehicle. In yet another non-limiting example, diagnostic information can be wirelessly communicated to a receiver that is not connected to the vehicle. Diagnostic information can be provided to a vehicle owner, a vehicle operator, service personnel, and the like by means of text messages, email, or other telematic means.

Additionally, it will be appreciated that the method disclosed herein is not limited to application in an electric power steering system. Rather, aspects of the present disclosure may be applied to any system that employs an electric motor to provide power assistance to an otherwise manual actuation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of operating an electric power steering system installed on a vehicle, the electric power steering system comprising an electric motor and a controller that receives a desired assist torque value and supplies a pulse-width modulation duty cycle to the electric motor, the method comprising the steps of:
    determining a value of electrical resistance of a wiring harness and at least one connector disposed to provide electrical power from a power source to the controller;
    determining a value of steering assistance torque available from the motor based on the determined electrical resistance of the wiring harness and the at least one connector;
    controlling the electric motor to achieve a nominal value of power steering assist torque when the value of steering assistance torque available from the motor is sufficient to achieve the nominal value of power steering assist torque; and
    controlling the electric motor to achieve a reduced value of power steering assist torque less than the nominal value when the value of steering assistance torque available from the motor is not sufficient to achieve the nominal value of power steering assist torque.

2. The method of claim 1, wherein the reduced value of power steering assist torque is achieved by limiting a maximum value of desired assist torque to a value that is calculated based on the determined electrical resistance.

3. The method of claim 1, wherein the reduced value of power steering assist torque is achieved by limiting a maximum pulse-width modulation duty cycle to a value that is calculated based on the determined electrical resistance.

4. The method of claim 1, further comprising providing notification to an operator of the vehicle when the power steering system has been controlled to operate with the reduced value of power steering assist torque.

5. The method of claim 1, further comprising providing diagnostic information when the power steering system has been controlled to operate with the reduced value of power steering assist torque.

6. The method of claim 5, wherein the step of providing diagnostic information includes storing the diagnostic information in non-volatile memory and communicating the diagnostic information to a reading device connected to a diagnostic port on the vehicle.

7. The method of claim 5, wherein the step of providing diagnostic information includes wirelessly communicating the diagnostic information to a receiver that is not physically connected to the vehicle.

8. A controller for an electric power steering system that includes an electric motor; the controller programmed to:
    receive a desired assist torque value;
    supply a pulse-width modulation duty cycle to the electric motor;
    determine a value of electrical resistance of a wiring harness and at least one connector disposed to provide electrical power from a power source to the controller;
    determine a value of steering assistance torque available from the motor based on the determined electrical resistance of the wiring harness and the at least one connector;
    control the electric motor to achieve a nominal value of power steering assist torque when the value of steering assistance torque available from the motor is sufficient to achieve the nominal value of power steering assist torque; and
    control the electric motor to achieve a reduced value of power steering assist torque less than the nominal value when the value of steering assistance torque available from the motor is not sufficient to achieve the nominal value of power steering assist torque.

9. The controller of claim 8, wherein the reduced value of power steering assist torque is achieved by limiting a maximum value of desired assist torque to a value that is calculated based on the determined electrical resistance.

10. The controller of claim 8, wherein the reduced value of power steering assist torque is achieved by limiting a maximum pulse-width modulation duty cycle to a value that is calculated based on the determined electrical resistance.

11. The controller of claim 8, wherein the controller is further programmed to provide notification to a vehicle operator when the power steering system has been controlled to operate with the reduced value of power steering assist torque.

12. The controller of claim 8, wherein the controller is further programmed to provide diagnostic information when the power steering system has been controlled to operate with the reduced value of power steering assist torque.

13. The controller of claim 12, wherein the controller is programmed to store the diagnostic information in non-volatile memory and to communicate the diagnostic information to a reading device connected to a diagnostic port communicatively coupled to the controller.

14. A method of operating a system comprising an electric motor and a controller that receives a desired assist torque value and supplies a pulse-width modulation duty cycle to the electric motor, the method comprising the steps of:
    determining a value of electrical resistance of a wiring harness and at least one connector disposed to provide electrical power from a power source to the controller;

determining a value of steering assistance torque available from the motor based on the determined electrical resistance of the wiring harness and the at least one connector;

controlling the electric motor to achieve a nominal value of assist torque when the value of steering assistance torque available from the motor is sufficient to achieve the nominal value of assist torque; and controlling the electric motor to achieve a reduced value of assist torque less than the nominal value when the value of steering assistance torque available from the motor is not sufficient to achieve the nominal value of assist torque.

15. The method of claim 14, wherein the reduced value of assist torque is achieved by limiting a maximum value of desired assist torque to a value that is calculated based on the determined electrical resistance.

16. The method of claim 14, wherein the reduced value of assist torque is achieved by limiting a maximum pulse-width modulation duty cycle to a value that is calculated based on the determined electrical resistance.

17. The method of claim 14, further comprising providing notification to an operator of the system when the system has been controlled to operate with the reduced value of assist torque.

18. The method of claim 14, further comprising providing diagnostic information when the system has been controlled to operate with the reduced value of assist torque.

19. The method of claim 18, wherein the step of providing diagnostic information includes storing the diagnostic information in non-volatile memory and communicating the diagnostic information to a reading device connected to a diagnostic port included in the system.

20. The method of claim 18, wherein the step of providing diagnostic information includes wirelessly communicating the diagnostic information to a receiver that is not physically connected to the system.

* * * * *